United States Patent
Luetze

(10) Patent No.: US 8,029,239 B2
(45) Date of Patent: Oct. 4, 2011

(54) ROTOR FOR A WIND ENERGY TURBINE AND METHOD FOR CONTROLLING THE TEMPERATURE INSIDE A ROTOR HUB

(75) Inventor: Henning Luetze, Bad Bentheim (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/283,162

(22) Filed: Nov. 18, 2005

(65) Prior Publication Data

US 2007/0116567 A1  May 24, 2007

(51) Int. Cl.
*F03D 1/06* (2006.01)
(52) U.S. Cl. .................. 416/91; 416/93 R; 416/96 R
(58) Field of Classification Search ............... 416/90 A, 416/93 R, 94, 91, 90 R, 232, 233
See application file for complete search history.

(56) References Cited

U.S. PATENT DOCUMENTS

| | | | | |
|---|---|---|---|---|
| 2,455,313 | A | * | 11/1948 | Osofsky .................. 416/95 |
| 2,510,170 | A | * | 6/1950 | Chillson et. al. .......... 416/96 R |
| 2,522,955 | A | * | 9/1950 | Martin .................. 416/97 R |
| 2,541,661 | A | * | 2/1951 | Palmatier et. al. ......... 416/90 R |
| 4,533,297 | A | | 8/1985 | Bassett |
| 4,557,666 | A | | 12/1985 | Baskin et al. |
| 4,565,929 | A | | 1/1986 | Baskin et al. |
| 5,161,952 | A | | 11/1992 | Eggers, Jr. |
| 5,354,175 | A | | 10/1994 | Coleman et al. |
| 6,514,043 | B1 | | 2/2003 | Rasmussen et al. |
| 6,676,122 | B1 | * | 1/2004 | Wobben .................. 290/55 |
| 7,011,497 | B2 | | 3/2006 | Schmidt |
| 2004/0253117 | A1 | | 12/2004 | Schmidt |
| 2005/0254949 | A1 | | 11/2005 | Schubert |
| 2006/0034692 | A1 | | 2/2006 | Grabau |
| 2006/0067828 | A1 | | 3/2006 | Wetzel |

FOREIGN PATENT DOCUMENTS

| | | | |
|---|---|---|---|
| CA | 2228145 C | * | 11/2003 |
| DE | 842330 A | * | 6/1952 |
| DE | 19528862 A1 | * | 2/1997 |
| DE | 19621485 A1 | * | 3/1998 |
| DE | 19802574 A1 | * | 3/1999 |
| EP | 1552143 B1 | * | 4/2007 |
| JP | 2003343417 A | * | 12/2003 |
| JP | 2005069082 A | * | 3/2005 |

OTHER PUBLICATIONS

DE 842,330 Machine translation. European Patent Office, Nov. 6, 2009.*
European Patent Office (EPO) Machine Translation of DE 19621485 Description. pp. 1-3. Accessed Jan. 22, 2010.*
European Patent Office (EPO) Machine Translation of DE 19621485 Claims. p. 1. Accessed Jan. 22, 2010.*
EPO Machine Translation of DE 19802574 A1. Accessed May 20, 2010.*
Machine translation of JP 2005-69082 A. Accessed Jul. 27, 2010.*

* cited by examiner

*Primary Examiner* — Richard Edgar
(74) *Attorney, Agent, or Firm* — James McGinness, Esq.; Armstrong Teasdale LLP

(57) ABSTRACT

A rotor for a wind energy turbine includes a hub defining an inner space and at least one rotor blade defining an inner space and having a tip and a root attached to the hub. The inner spaces of the hub and the at least one rotor blade are in fluid communication. The rotor further includes air flow means for causing air to flow out of the hub and into the at least one rotor blade.

6 Claims, 2 Drawing Sheets

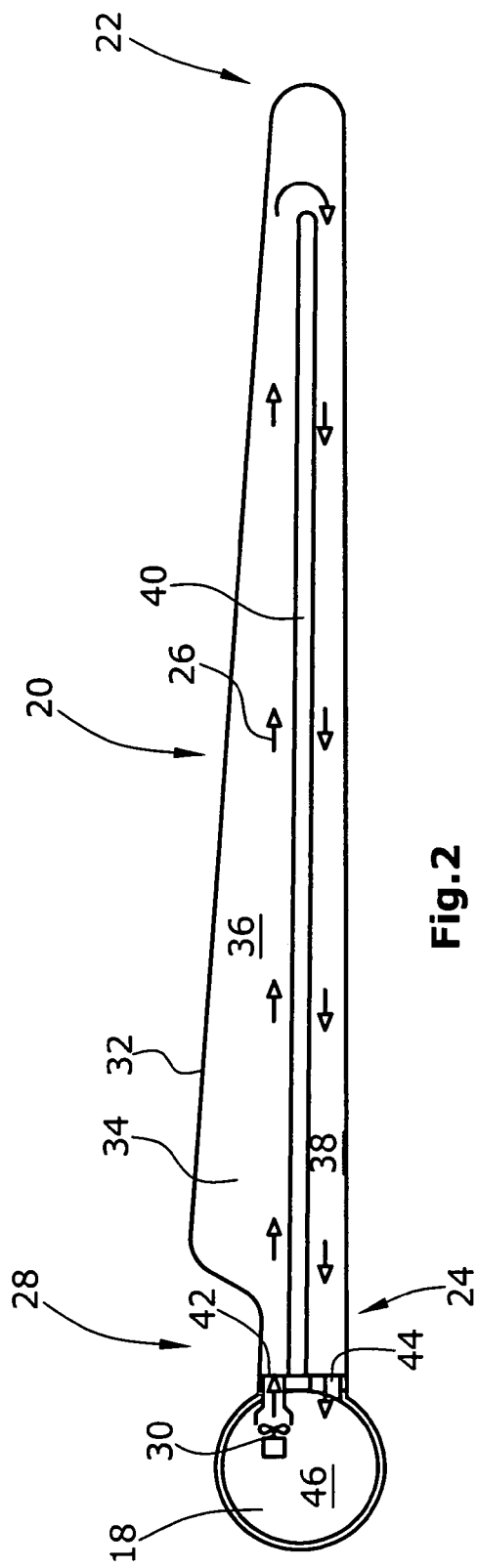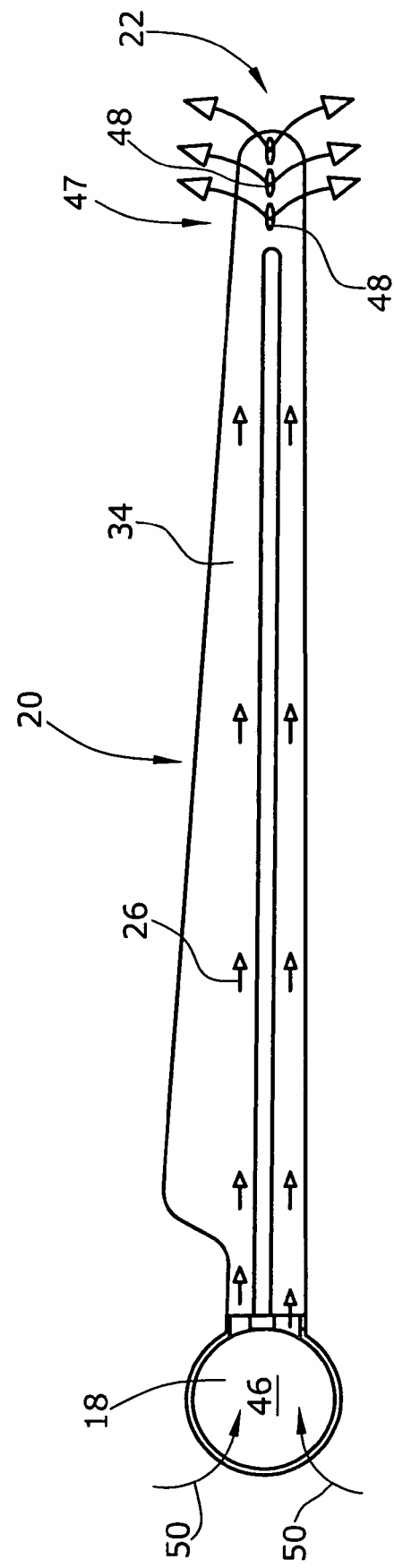

ROTOR FOR A WIND ENERGY TURBINE AND METHOD FOR CONTROLLING THE TEMPERATURE INSIDE A ROTOR HUB

BACKGROUND OF THE INVENTION

This invention relates generally to wind turbines, and more particularly to the control of the temperature inside a hub of a rotor of a wind energy turbine.

Large modern type energy turbines include rotors having hubs which include several components such as a rotor blade actuator (pitch) drive which produce energy losses in the form of heat that increases the temperature inside the hub. In some types of wind energy turbines, the temperature inside the hub increases due to heat flow from components of the nacelle located close to the hub of the rotor. Due to the shaft of the rotor extending from the hub into the nacelle there is a relatively large opening between the hub and the nacelle where warm air from inside the nacelle can easily propagate into the hub. At higher ambient temperatures the above-identified two effects can lead to temperature levels inside the hub which are higher than the upper temperature limits tolerable for the components arranged in the hub.

BRIEF DESCRIPTION OF THE INVENTION

In one aspect a rotor for a wind energy turbine includes a hub defining an inner space, at least one rotor blade defining an inner space and having a tip and a root attached to the hub, wherein the inner spaces of the hub and the at least one rotor blade are in fluid communication, and air flow means for causing air to flow out of the hub and into the at least one rotor blade.

In another aspect of the present invention there is provided a method for controlling the temperature inside a hub of a rotor of a wind energy turbine. The rotor comprises the hub and at least one rotor blade having a tip and a root attached to the hub. The method comprising the step of providing a fluid communication between the hub and an inner space of the at least one rotor blade for exchanging air between the hub and the inner space of the at least one rotor blade.

BRIEF DESCRIPTION OF THE DRAWINGS

FIG. 2 is a schematic diagram of a first alternative for an air flow for temperature controlling purposes inside the hub.

FIG. 3 shows a second alternative for an air flow for temperature controlling purposes inside the hub.

DETAILED DESCRIPTION OF THE INVENTION

Figure 1:
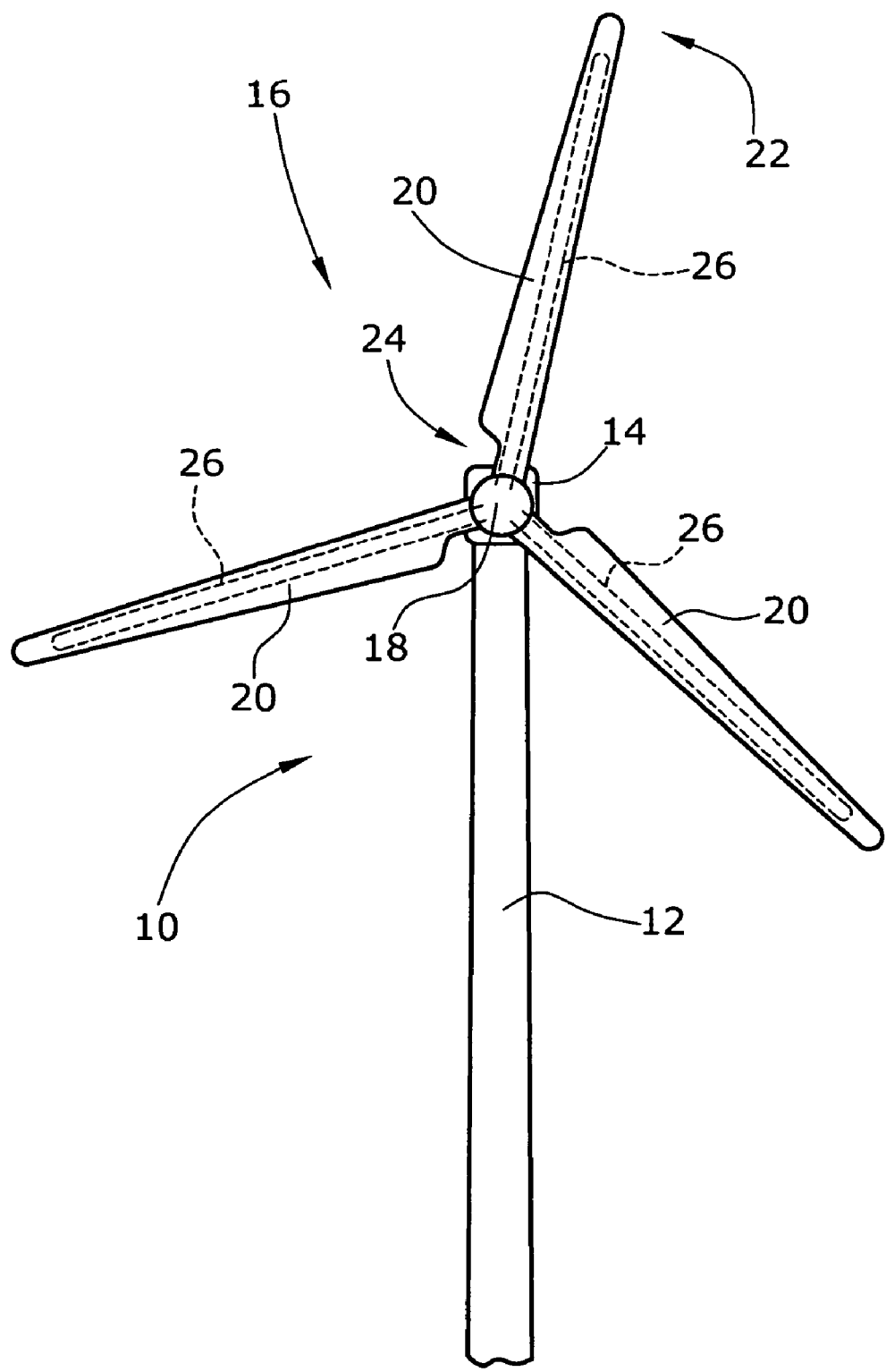
FIG. 1 shows a front view of a wind energy turbine schematically indicating the air flow inside the blades for cooling purposes of the hub.

In order to solve the problem of increased temperature inside a rotor hub of a wind energy turbine, by way of the present invention there is suggested an air flow means for causing air to flow from inside the hub out of the hub and into the inner space of the at least one rotor blade attached at its root to the hub. The inner space of the hub and the inner space of the at least one rotor blade are in fluid communication with each other at the root of the at least one rotor blade for the exchange of air between the inner spaces of the hub and blade. The air flowing from the hub into the at least one rotor blade exits the same to the outside thereof or may re-enter the hub after having flown through the inner space or at least a part of the inner space of the at least one rotor blade.

Typically the air flow means is designed as either an active system or as a passive system. In an active system the air flow means includes a fan arranged in the hub for blowing air from the hub into the at least one rotor blade. As an alternative, the fan is located inside the at least one rotor blade for sucking air from the hub into the at least one rotor blade.

Modern rotor blades comprise an outer shell defining the inner space of the rotor blade. The outer shell includes a spar having two spar cabs located at opposite walls of the outer shell and connected by a supporting web or wall extending longitudinally through the rotor blade from a site close to the root to a site close to the tip of the rotor blade. The inner supporting web separates the inner space of the rotor blade into two half spaces which are in fluid communication with each other at the tip of the blade and wherein both half spaces at the root of the rotor blade are in fluid communication with the hub by way of two separate openings. In an active air flow means the fan is arranged, e.g. in the hub, in order to blow heated air through one of the two openings in the root of the rotor blade into the respective one half space. The air flows through this half space towards the tip of the rotor blade and, at the tip, into the other half space and back towards the hub. The air is cooled when it flows along the inner surface of the shell of the rotor blade so that heated air from inside the hub is cooled within the at least one rotor blade and is fed back as cooled air into the hub. In this active system the fan can also be arranged within one of the openings at the root of the rotor blade.

A passive air flow means which can also be used according to the invention, comprises openings within the outer shell of the at least one rotor blade connected to the hub. Upon rotation of the rotor, due to the Venturi effect, a vacuum or underpressure is generated within the at least one rotor blade which in turn results in sucking air from the hub into the at least one rotor blade.

The invention can be used both for cooling the inner space of the hub at higher ambient temperatures but also for heating the interior of the hub during winter time. The rotor blades of a wind energy turbine hub may be heated up from solar radiation so that this heat can be used to cause warm air to flow out of the inner space of the at least one rotor blade into the hub. By this action, a temperature control inside the hub is performed to keep the temperature inside the hub more constantly and closer to e.g. the optimal design temperature of batteries or other operating components inside the hub which increases the lifetime of these components.

FIG. 1 depicts a wind energy turbine 10 comprising a tower 12 and a nacelle rotatably supported by tower 12 as well as a rotor 16 rotatably supported by nacelle 14. Rotor 16 includes a central hub 18 and three rotor blades 20 mounted to hub 18. Each rotor blade 20 includes an outer tip 22 and an inner root 24 attached to hub 18. Dotted lines 26 schematically indicate an air flow out of hub 18 and through the inside of rotor blades 20 for controlling the temperature inside hub 18. The embodiment shown in FIG. 1 comprises a three blade rotor 16. However, the number of blades 20 of rotor 16 is not critical to the invention. Also it is not necessary that, for temperature controlling purposes inside hub 18, an air flow 26 has to be established through all rotor blades 20. Accordingly, the present invention also functions in a one blade rotor or in a multiple blade rotor wherein an air flow is generated from hub 18 towards at least one of the rotor blades and through this at least one rotor blade 20.

FIG. 2 shows a first alternative for an air flow means 28 arranged within hub 18 and creating a circulating air flow 26 from hub 18 through blade 20 and back to hub 18. This active air flow means 18 includes a motorized fan 30 arranged inside hub 18. Fan 30 can also be arranged within blade 20. Blade 20 typically includes an outer shell or wall 32 defining an inner space 34 which is divided into two half spaces 36, 38 by means of an inner supporting wall 40 for stiffening and stabilizing outer shell 32 of blade 20. Inner supporting wall 40 extends from root 24 of rotor blade 20 towards close to its tip 22 at which the two half spaces 36, 38 are in fluid communication with each other. At root 24 of blade 20 there are two separate openings, namely one inlet opening 42 and one outlet opening 44. Air to be temperature-controlled from inside hub 18 is blown by means of fan 30 out of hub 18 and into half space 36 through which the air flows in a longitudinal direction of rotor blade 20 through the same. At tip 22 the air enters the second half space 38 through which the air flows back into the inside 46 of hub 18. This air flow system is useful for cooling the air within hub 18 in that the air when flowing through rotor blade 20 is cooled at the inner surface of rotor blade 20 so as to re-enter hub 18 as cooled air. However, this system can also be used to heat the air inside the hub, such as during winter time or cold weather conditions. By means of sensors (not shown) the temperature difference between hub and blade inner air temperatures can be determined while a controller (not shown) controls the heat transfer by activating or deactivating fan 30 so that cooling is provided if the temperature difference between blade and hub inner air temperatures would allow cooling or heating effect as desired.

FIG. 3 shows an alternative embodiment for a passive air flow means 47. As far as the elements shown in FIG. 3 are identical in their construction or function to the elements shown in FIG. 2, the same reference numerals are used in FIG. 3.

Passive air flow means 47 according to FIG. 3 includes at least one opening 48 at tip 22 of at least one of rotor blades 20. In this embodiment tip 22 of rotor blade 20 includes three openings 48. Moreover, in passive air flow means 47 air can be sucked into interior 46 of hub 18 from outside of rotor blade 20, which is indicated in FIG. 3 by arrows 50. Upon rotation of the rotor provided with passive air flow means 47 according to FIG. 3, due to the Venturi effect an under-pressure or vacuum is generated in inner space 34 of rotor blade 24. This under-pressure or vacuum causes an air flow 26 directed from inner space 46 of hub 18 towards openings 48 at tip 22 of blade 20. Due to the vacuum and under-pressure within hub 18, ambient air is sucked from outside of the rotor into hub 18 for cooling purposes.

By means of the present invention components located inside the hub like rotor blade actuator drives (motors), converters and batteries can be effectively cooled or kept at a more constant temperature close to their optimal design temperatures. Due to this cooling or temperature control effect, it is easily possible to design motors and converters for the pitch application because the temperature ratings do not need to be extreme. Also installation of wind turbines at higher altitudes would be more feasible. Finally, the lifetime of the batteries would increase as the operation or temperature would be held more constantly and closer to the optimal design temperature. Finally, temperature control within the hub is also useful with regard to wind energy turbine types having arranged heat generating elements within the nacelle and rather close to the rotor. On high-temperature sites or high-altitude sites also for current gear box design wind turbines, the present invention would be suitable in order to cool the hub located next to the gear box.

While the invention has been described in terms of various specific embodiments, those skilled in the art will recognize that the invention can be practiced with modification within the spirit and scope of the claims.

What is claimed is:

1. A rotor for a wind energy turbine comprising:
a hub defining an inner space and configured to contain at least a portion of one or more wind turbine components;
at least one rotor blade coupled to said hub, an inner space defined by said at least one rotor blade in flow communication with the inner space of said hub for exchanging air between the inner space of said hub and the inner space of said at least one rotor blade, said at least one rotor blade having a tip and a root attached to said hub, said at least one rotor blade comprising an outer shell and an inner supporting wall extending longitudinally through said at least one rotor blade from said root to said tip and separating the inner space of said at least one rotor blade into a first portion and a second portion that is in fluid communication with the first portion at said tip, said root defining a first opening and a second opening, wherein the inner space of said hub is in fluid communication with the first portion through said first opening and with the second portion through said second opening;
at least one fan positioned within the inner space of said hub, said at least one fan in flow communication with said hub inner space and configured to channel a flow of heated air from the hub inner space, through one of said first opening and said second opening, and into said at least one rotor blade to facilitate cooling the heated air, said fan further configured to channel the cooled air from the rotor blade to the hub inner space to facilitate cooling the wind turbine components positioned within said hub inner space;
a plurality of sensors configured to sense a temperature difference between a blade inner air temperature and a hub inner air temperature, at least a first sensor is positioned within the blade inner space for sensing the blade inner air temperature and at least a second sensor is positioned within the hub inner space for sensing the hub inner air temperature; and
a controller operatively coupled to said fan, said controller configured to operate said fan based on a difference between the sensed blade inner air temperature and the sensed hub inner air temperature.

2. The rotor according to claim 1 wherein said fan is positioned adjacent the first opening for channeling air into the blade inner space from the hub inner space through the first opening.

3. The rotor according to claim 2 wherein the air is blown by said fan into the first portion of said at least one rotor blade while the blown air re-enters said hub via the second portion of said rotor blade.

4. A method for controlling a temperature inside a hub of a rotor of a wind energy turbine, wherein the rotor comprises the hub, the hub defining an inner space and configured to contain at least a portion of one or more wind turbine components, and at least one rotor blade defining an inner space and having a tip and a root attached to the hub, the root defining a first opening and a second opening, the at least one rotor blade including an outer shell and an inner supporting wall extending longitudinally through the at least one rotor blade from the root to the tip and separating the inner space of the at least one rotor blade into a first portion and a second portion that is in fluid communication with the first portion at the tip, said method comprising:
coupling the at least one rotor blade in flow communication with the hub for exchanging air between the inner space of the hub and the inner space of the at least one rotor blade;

providing a fluid communication between the inner space of the hub and the first portion through the first opening and between the inner space of the hub and the second portion through the second opening;

positioning at least one fan within the inner space of the hub, the fan configured to channel air between the inner space of the hub and the inner space of the rotor blade;

providing a first sensor positioned within the at least one rotor blade and configured to sense a blade inner air temperature;

providing a second sensor positioned within the hub inner space and configured to sense a hub inner air temperature;

operatively coupling a controller to the fan, the controller configured to operate the fan based on a difference between the sensed blade inner air temperature and the sensed hub inner air temperature; and activating the fan when a blade inner air temperature is less than a hub inner air temperature to facilitate reducing a temperature of the wind turbine components within the hub inner space.

5. The method according to claim 4 further comprising activating the fan to channel an air flow between the inner space of the hub and the first portion of the at least one blade and further to the second portion of the at least one blade from which the air flow re-enters into the inner space of the hub, wherein the temperature of the air is influenced by the temperature of the at least one blade through which the air flows.

6. The method according to claim 5 further comprising channeling a flow of heated air from the hub inner space towards an inner surface of the blade outer shell to facilitate cooling the heated air, and channeling the cooled air to the hub to facilitate cooling the hub inner space.

* * * * *